United States Patent
Kobayashi et al.

(10) Patent No.: US 6,775,086 B1
(45) Date of Patent: Aug. 10, 2004

(54) MAGNETIC TAPE APPARATUS AND METHOD FOR CONTROLLING THE RUNNING OF A MAGNETIC TAPE TO STOP AT A STOP POSITION

(75) Inventors: Masayoshi Kobayashi, Kawasaki (JP); Masahiko Sakaguchi, Hyogo (JP); Tsuneyoshi Oohara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/537,009

(22) Filed: Mar. 28, 2000

(30) Foreign Application Priority Data

Aug. 17, 1999 (JP) .......................................... 11-230585

(51) Int. Cl.[7] .......................... G11B 15/48; G11B 15/18; G11B 17/00
(52) U.S. Cl. ...................... 360/74.1; 360/69; 360/72.1
(58) Field of Search .............................. 360/72.1, 74.1, 360/69

(56) References Cited

U.S. PATENT DOCUMENTS

| | | | | |
|---|---|---|---|---|
| 4,786,981 A | * | 11/1988 | Sekimoto et al. .............. 386/52 |
| 4,821,129 A | * | 4/1989 | Culp ........................... 360/74.4 |
| 4,987,502 A | * | 1/1991 | Freeze ........................... 360/75 |
| 5,101,311 A | * | 3/1992 | Richmond ................... 360/69 |
| 5,552,943 A | * | 9/1996 | Hirano et al. ............... 360/72.2 |
| 5,608,585 A | * | 3/1997 | Masuda et al. ............. 360/72.1 |
| 6,493,167 B2 | * | 12/2002 | Kobayashi et al. ........ 360/72.3 |

FOREIGN PATENT DOCUMENTS

| | | | | |
|---|---|---|---|---|
| JP | 10-092058 | | 4/1998 | |
| WO | WO 9321630 A1 | * | 10/1993 | ........... G11B/15/20 |

* cited by examiner

*Primary Examiner*—David Hudspeth
*Assistant Examiner*—Jason Olson
(74) *Attorney, Agent, or Firm*—Greer, Burns & Crain, Ltd.

(57) ABSTRACT

In a magnetic tape apparatus for controlling a running of a magnetic tape to stop at a reference stop position, a control part controls the feed reel shaft and the take-up reel shaft to reel the magnetic tape and a stop position control part displaces a stop position of the magnetic tape from the reference position wherein the control part activates the stop position control part to displace the stop position when the control part stops running the magnetic tape.

14 Claims, 8 Drawing Sheets

FWD RUNNING — Gap In

STOP POSITION   TURNOVER POSITION

BWD RUNNINT — Gap In

TURNOVER POSITION   STOP POSITION

MAGNETIC TAPE APPARATUS AND METHOD FOR CONTROLLING THE RUNNING OF A MAGNETIC TAPE TO STOP AT A STOP POSITION

BACKGROUND OF THE INVENTION

1. Field of the Invention

The present invention generally relates to magnetic tape apparatuses and methods for controlling the running of a magnetic tape so as to stop at a stop position, and more particularly to a magnetic tape apparatus and a method for controlling the running of a magnetic tape for writing or reading data so as to stop at a stop position.

2. Description of the Related Art

In a conventional magnetic tape apparatus controlling the running of a magnetic tape, the magnetic tape is stopped with a predetermined timing when data on the magnetic tape is read, when data is written on the magnetic tape, or when an EOT (end of tape) mark is detected, or when the magnetic tape is reeled from one stop position to another stop position after being stationary for a predetermined time interval, for avoiding adhering of dust (hereinafter, this operation is called a patrol reposition). In a case of running a cleaning medium to clean a magnetic head, a predetermined section of the cleaning medium is always used for the magnetic head cleaning operation.

In the conventional magnetic tape apparatus, as mentioned above, the magnetic tape is always stopped with a predetermined timing. Thus, the magnetic tape is abraded at the same position or the same section. Further, dust tends to adhere on the same position or the same section of the magnetic tape surface. As a result, recording of data on the magnetic tape or reading of data from the magnetic tape may not be carried out optimally.

In addition, in the conventional magnetic tape apparatus, one predetermined section on the cleaning medium may be used heavily in the cleaning operation. Thus, in the conventional magnetic tape apparatus, even if an entire area of the cleaning medium is two times longer than an area required for one cleaning operation, the cleaning medium is not effectively utilized, that is, only one section of the cleaning medium is frequently used. Accordingly, the cleaning effect of the cleaning medium is quickly degraded.

SUMMARY OF THE INVENTION

It is a general object of the present invention to provide a magnetic tape apparatus in which the above-mentioned problems are eliminated.

A more specific first object of the present invention is to provide a magnetic tape apparatus and a method for controlling the running of a magnetic tape so as to stop at controlled stop positions so that the magnetic tape can be prevented from being abraded or from collecting dust on the magnetic tape surface.

A second specific object of the present invention is to provide a magnetic tape apparatus and a method for controlling the running of a magnetic tape so as to stop at controlled stop positions controlled so as to evenly utilize the entire area of a cleaning medium.

The above first object of the present invention is achieved by a magnetic tape apparatus for controlling the running of a magnetic tape so as to stop at a reference stop position, including: a feed reel shaft and a take-up reel shaft respectively adapted to hold a feed reel and a take-up reel of the magnetic tape; a magnetic head; a control part controlling the feed reel shaft and the take-up reel shaft so as to reel the magnetic tape; and a stop position control part displacing a stop position of the magnetic tape from the reference position, wherein said control part activates the stop position control part so as to displace the stop position each time said control part stops running of the magnetic tape.

According to the present invention, the stop position is displaced each time the magnetic tape is stopped. Therefore, it is possible to prevent the magnetic tape from being severely abraded at the specific position and prevent dust from adhering on specific areas of the magnetic tape surface.

Also, the above first object of the present invention is achieved by a method for controlling a running of a magnetic tape so as to stop at a stop reference position, including the steps of: (a) controlling a feed reel shaft and a take-up reel shaft so as to reel the magnetic tape; and (b) displacing a stop position of the magnetic tape from the reference position, wherein the step (a) activates the step (b) so as to displace the stop position each time said control part stops running of the magnetic tape.

According to the present invention, the stop position is displaced each time the magnetic tape is stopped. Therefore, the magnetic tape can be prevented from being severely abraded at the specific position and from collecting dust on specific areas of the magnetic tape surface.

Furthermore, the above second object of the present invention is achieved by a magnetic tape apparatus for controlling the running of a magnetic tape, the magnetic tape apparatus controlling a cleaning medium so as to clean a magnetic head, including: a feed reel shaft and a take-up reel shaft respectively adapted to hold a feed reel and a take-up reel of the cleaning medium; a magnetic head; a control part controlling the feed reel shaft and the take-up reel shaft so as to reel the cleaning medium; and a cleaning section determining part determining a cleaning section on the cleaning medium that is used for a single cleaning step of the magnetic head, wherein said control part controls the feed reel shaft and the take-up reel shaft to clean the magnetic head for the cleaning section by the cleaning medium.

According to the present invention, the cleaning section on the cleaning medium is shifted each time the magnetic head is cleaned. Thus, it is possible to prevent from starting the cleaning step from the beginning of the cleaning medium every time. The entire cleaning medium can be evenly utilized. Consequently, the endurance of the cleaning medium can be improved.

Also, the above second object of the present invention is achieved by a method for controlling a running of a magnetic tape, the method controllable of a cleaning medium to clean a magnetic head, comprising the steps of: (a) controlling the feed reel shaft and the take-up reel shaft so as to reel the cleaning medium; and (b) determining a cleaning section on the cleaning medium that is used for a single cleaning step of the magnetic head, wherein said step (a) controls the feed reel shaft and the take-up reel shaft to clean the magnetic head for the cleaning section by the cleaning medium.

According to the present invention, the cleaning section on the cleaning medium is shifted each time the magnetic head is cleaned. Thus, it is possible to prevent from starting the cleaning step from the beginning of the cleaning medium every time. The entire cleaning medium can be evenly utilized. Consequently, the method can improve the endurance of the cleaning medium.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1A:
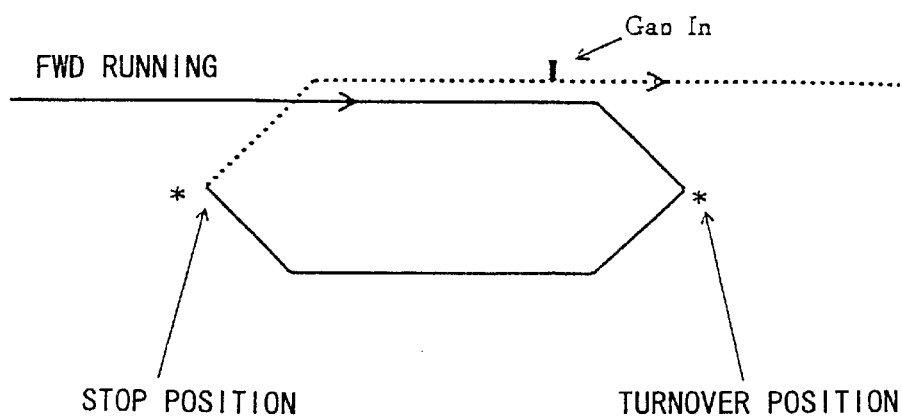
FIG. 1A is a diagram showing a forward running operation of a magnetic tape apparatus from the related art and FIG. 1B is a diagram showing a backward running operation of a magnetic tape apparatus from the related art.

A related art magnetic tape operation will now be described with reference to FIG. 1A and FIG. 1B. FIG. 1A is a diagram showing a forward running operation of a magnetic tape from the related art and FIG. 1B is a diagram showing a backward running operation of a magnetic tape from the related art.

Figure 1B:
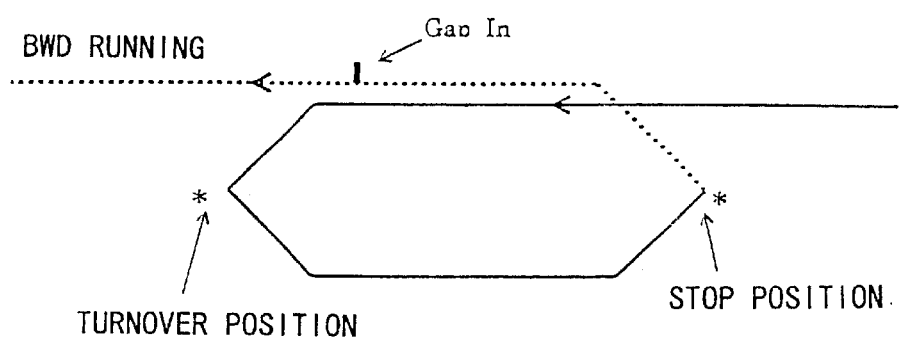

As shown in FIG. 1A and FIG. 1B, in the magnetic tape operation, when data stored on the magnetic tape is read, a tape running is stopped or turned over (rewound) by predetermined timing or when data is written to the magnetic tape, or when the EOT is detected, or when the patrol reposition is carried out. In this case, a specific position of the magnetic tape is easily abraded and also dusts tend to adhere on the specific area of the magnetic tape surface. Therefore, in order to prevent the magnetic tape from being abraded or contaminated by dust, it is desired to avoid turning over and stopping the magnetic tape at the same position repeatedly.

Figure 2:
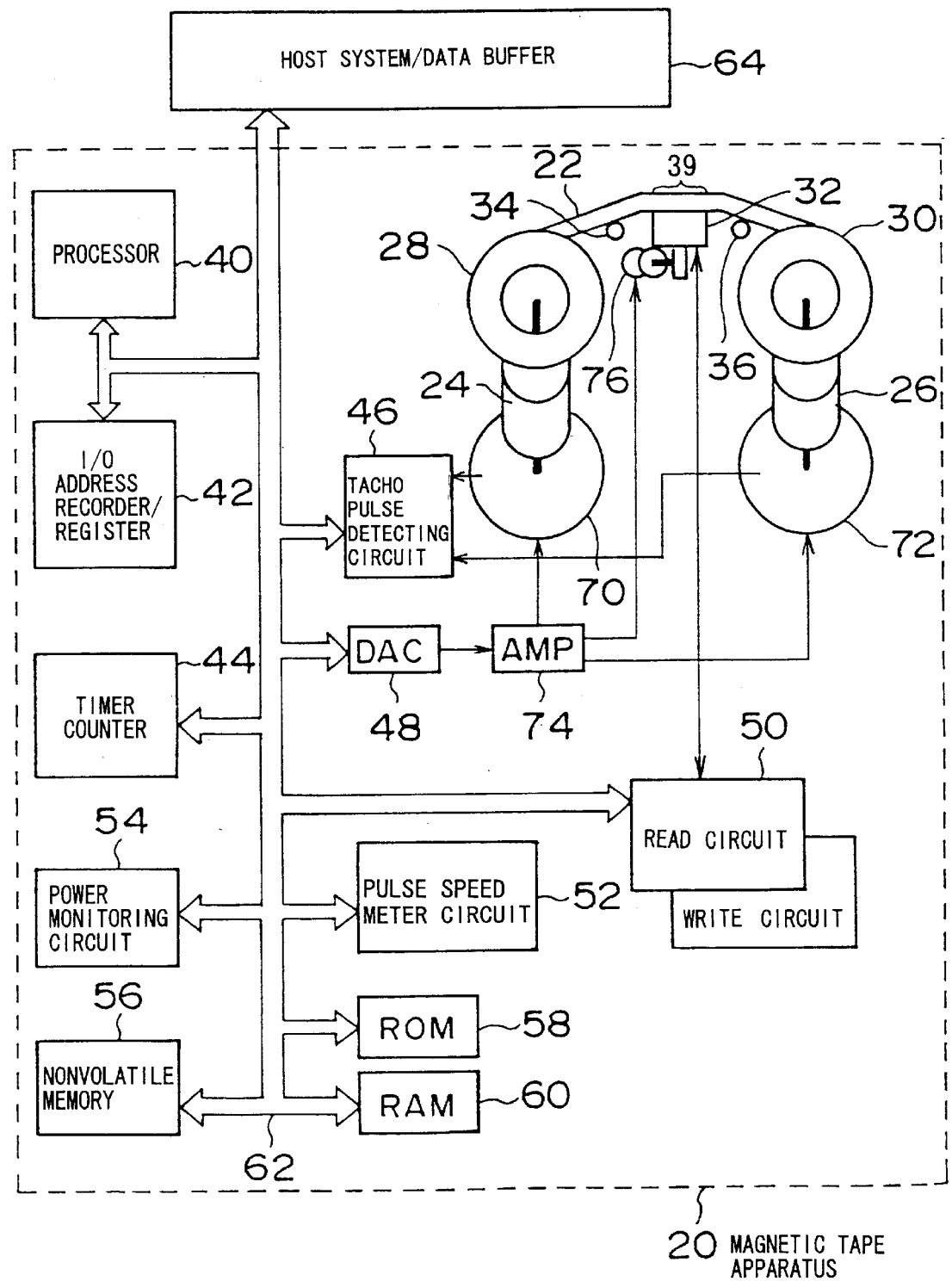
FIG. 2 is a diagram showing a configuration of a magnetic tape apparatus 20 according to a first embodiment of the present invention.

FIG. 2 is a diagram showing a configuration of a magnetic tape apparatus 20 according to a first embodiment of the present invention. The magnetic tape apparatus 20 writes data to a magnetic tape 22 or reads data from the magnetic tape 22 by reeling the magnetic tape 22 accommodated in a tape cassette (not shown). Data is recorded in data blocks on the tape while a predetermined interval is provided between data blocks such that a running operation of the magnetic tape is stopped after or started before a data block.

As shown in FIG. 2, the magnetic tape apparatus 20 includes a feed reel 24 and a take-up reel 26. A feed reel 28 and a take-up reel 30 are provided in the tape cassette to reel the magnetic tape 22. The tape cassette is mounted on the magnetic tape apparatus 20 such that the feed reel 28 and the take-up reel 30 are brought into engagement with a feed reel shaft 24 and a take-up reel shaft 26, respectively. The magnetic tape apparatus 20 further includes a magnetic head 32 that makes contact with a surface of the magnetic tape 22 when the tape cassette is mounted. The magnetic apparatus 20 records data on the magnetic tape 22 or reads data from the magnetic tape 22 by using the magnetic head 32.

In the magnetic tape apparatus 20, tape cleaners 34 and 36 are provided at both sides of the magnetic head 32. The tape cleaners 34 and 36 remove dust from the surface of the magnetic tape 22 by making a contact engagement with the surface of the magnetic tape 22. In order to prevent dust from adhering on the surface of the magnetic tape 22, the running operation of magnetic tape 22 is controlled so as to move compulsorily to another stop position when the running has stopped for a predetermined time interval. In this case, the magnetic tape 22 is controlled to run for a distance such that a facing area 39 of the magnetic tape 22 facing the magnetic head 32 can pass over the tape cleaner 34 or 36.

The magnetic tape apparatus 20 includes a processor 40, an I/O address recorder/register 42, a tacho pulse detecting circuit 46, a digital analog converter (DAC) unit 48, a read/write circuit 50, a pulse speed meter circuit 52, a power monitoring circuit 54, a nonvolatile memory 56, ROM 58, and RAM 60, which are mutually connected by a bus 62. The magnetic tape apparatus 20 is connected to a host system 64 via the bus 62.

The tacho pulse detecting circuit 46 detects rotation amounts of the feed reel shaft 24 and the take-up reel shaft 26 based on output signals from sensors provided at the outsides of the feed reel shaft 24 and take-up reel shaft 26. The read/write circuit 50 is connected to the magnetic head 32 and supplies the magnetic head 32 with signals corresponding to data to be recorded on the magnetic tape 22 or receives signals corresponding to data being recorded on the magnetic tape 22 and read by the magnetic head 32. The pulse speed meter circuit 52 measures the running speed of the magnetic tape 22 based on output signals from the read/write circuit 50 each time the magnetic head 32 reads a predetermined signal recorded on the magnetic tape 22 at a predetermined interval. When the condition to stop the magnetic tape 22 is satisfied, the timer counter 44 counts time that is used to stop the magnetic tape 22.

The magnetic tape apparatus 20 further includes a feed reel motor 70 and a take-up reel motor 72 that drive the feed reel shaft 24 and the take-up reel shaft 26, respectively. The feed reel motor 70 and the take-up reel motor 72 are connected to the processor 40 via an amplifier unit 74 and the DAC unit 48. The processor 40 calculates a motor current that is supplied to the motors 70 and 72 such that the magnetic tape 22 runs at speed based on a calculation result and then outputs a signal corresponding to the motor current to the amplifier unit 74. The motors 70 and 72 rotate the feed reel shaft 24 and the take-up reel shaft 26 based on an instruction signal supplied from the processor 40. In the above configuration, the magnetic tape apparatus 20 runs the magnetic tape 22, which is accommodated in the tape cassette, by the feed reel motor 70 and the take-up reel motor 72 controlled by the processor 40.

In addition, the magnetic tape apparatus 20 includes a motor 76 that moves the magnetic head 32 in a width direction across the magnetic tape 22. The motor 76 is also connected to the processor 40 via the amplifier unit 74 and the DAC unit 48. When a cleaning tape instead of the magnetic tape 22 is used to clean the magnetic head 32, the processor 40 calculates the motor current to supply the motor 76 such that the magnetic head 32 moves in the width direction across the cleaning tape and then outputs a signal corresponding to the motor current to the amplifier unit 74. The motor 76 moves the magnetic head 32 in the width direction across the cleaning tape based on the instruction signal supplied by the processor 40.

The power monitoring circuit 54 detects an abnormal condition of a power source supplied to the magnetic tape apparatus 20. The ROM 58 stores programs to be executed by the processor 40. The RAM 60 stores current programs executed by the processor 40. Also, the cleaning number of cleaning the magnetic head 32, that is, a cleaning frequency M of the cleaning tape is stored in the nonvolatile memory 56. When the cleaning tape for the magnetic tape 22 is used, the processor 40 determines a cleaning position for the cleaning tape to clean the magnetic head 32 based on the cleaning frequency M stored in the nonvolatile memory 56 (described later). Accordingly, the instruction signal is supplied to the feed reel motor 70 and the take-up reel motor 72 in order to clean the magnetic head 32 at normal speed after the cleaning tape is reeled to the determined cleaning position.

In the magnetic tape apparatus 20 according to the present invention, in order to avoid turning over or stopping at the same position, the timing for a turnover instruction signal or stop instruction signal, which is supplied the feed reel motor 70 and the take-up reel motor 72, is changed each time the magnetic tape 22 is turned over or stopped. Thus, the turnover position and the stop position on the magnetic tape 22 can be displaced. Advantageously, the magnetic tape apparatus 20 according to the present invention has a feature that changes the timing of the instruction signal for the feed reel motor 70 and the take-up reel motor 72 as mentioned above.

Figure 3A:
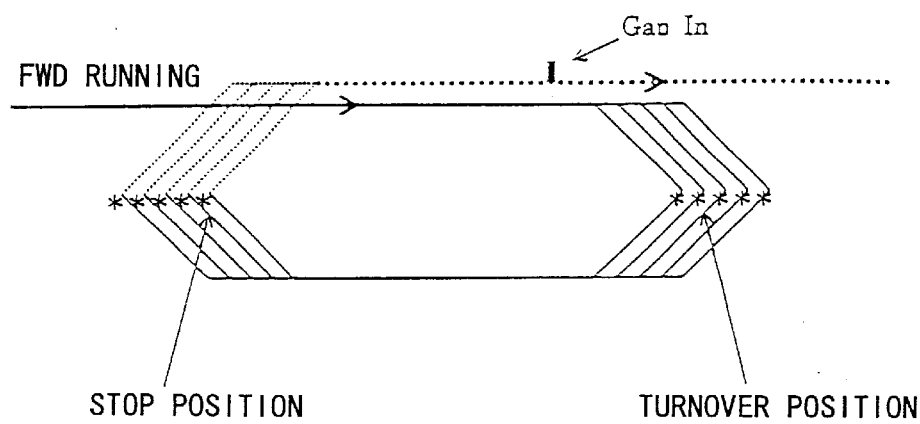
FIG. 3A is a diagram showing a forward running operation of a magnetic tape according to the first embodiment of the present invention and FIG. 3B is a diagram showing a backward running operation of a magnetic tape according to the first embodiment of the present invention.
Figure 3B:
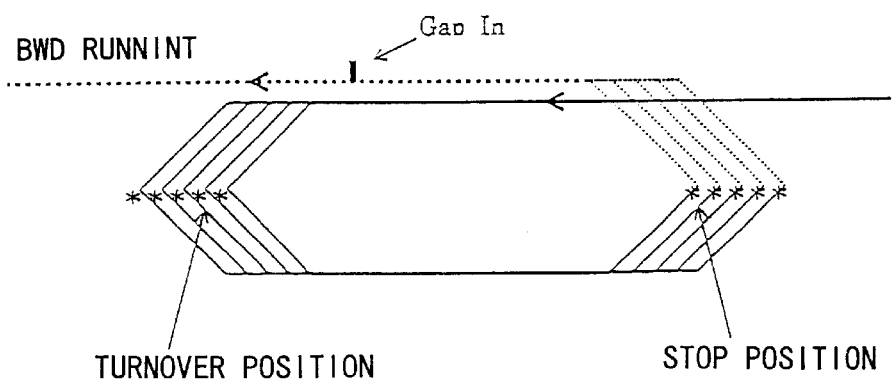

An operation of the magnetic tape 22 after a read/write operation is completed will be now described according to the present invention. FIG. 3A is a diagram showing a forward running operation of a magnetic tape 22 according to the first embodiment of the present invention and FIG. 3B is a diagram showing a backward running operation of a magnetic tape according to the first embodiment of the present invention. As shown in FIG. 3A and FIG. 3B, the magnetic tape apparatus 20 in this embodiment displaces the turnover position or stop position on the magnetic tape 22 at every turnover or stop. Hence, when data recorded on the magnetic tape 22 is read or data is written on the magnetic tape 22, or when the EOT is detected, or when the patrol reposition is carried out, the apparatus can avoid the problem of magnetic tape 22 turned over or stopped at the same position. Accordingly, it is possible to prevent specific positions on the magnetic tape 22 from being severely abraded. Further, deposition of dust on the magnetic tape 22 is also prevented.

Figure 4:
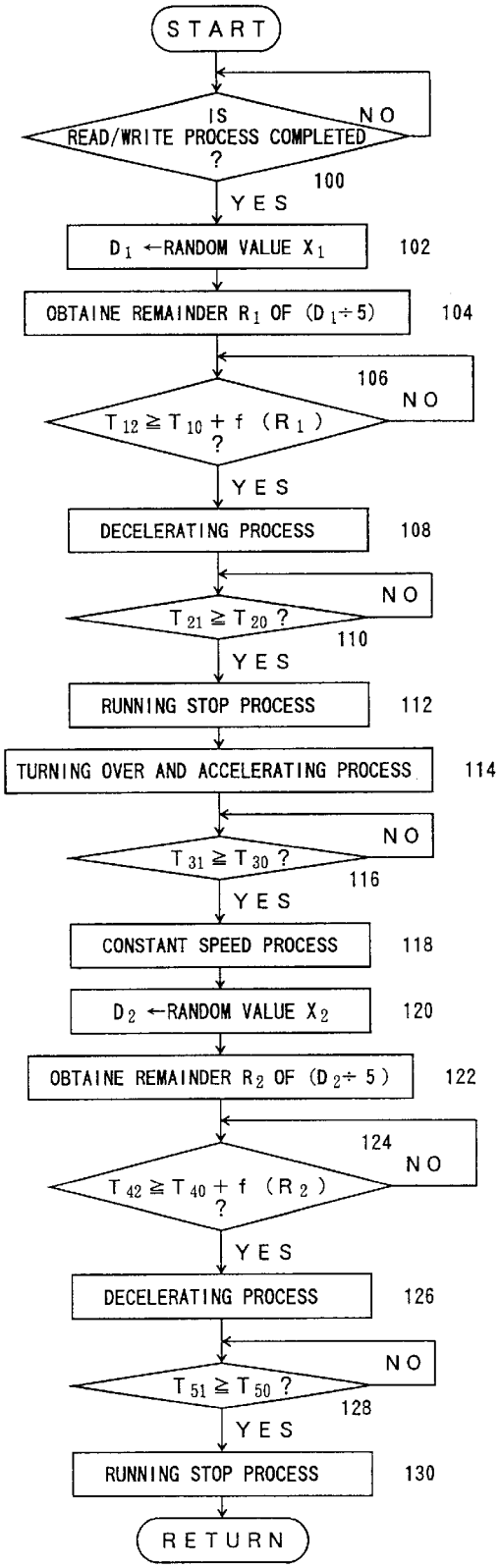
FIG. 4 is a flow chart for explaining a control routine executed by the processor part after a read/write process to the magnetic tape is completed, according to the first embodiment of the present invention.

FIG. 4 is a flow chart for explaining a control routine executed by the processor 40 when a read/write process to the magnetic tape 22 is completed. The control routine shown in FIG. 4 is executed each time the control routine is completed. With the start of the routine shown in FIG. 4, the process in a step 100 is processed.

In the step 100, it is determined whether or not the read/write process is completed. The process in the step 100 is repeated until the read/write process is completed. As a result, when the condition is satisfied, the process in a step 102 is processed next.

In the step 102, data $D_1$ is converted to a random value $X_1$. The random $X_1$ is obtained from a predetermined random table.

In the step 104, a remainder $R_1$ is obtained from the expression data $D_1$ divided by 5. Subsequently, a supply timing $T_{11}$ for turnover instruction signals to the feed reel motor 70 and the take-up reel motor 72 is set to be a value resulting from adding a time $f(R_1)$, which is proportional to the remainder $R_1$, to a reference time $T_{10}$. The reference time $T_{10}$ is a minimum time until a decelerating process of the magnetic tape 22 is started after the read/write process is completed.

In the first embodiment, when the read/write process to the magnetic tape 22 is completed, the supply timing for the turnover instruction signal or the stop instruction signal to the feed reel motor 70 and the take-up reel motor 72 is selected from five timing options. Each timing option is determined based on a time difference that is required to pass over at least a length of a contact area 39 between the magnetic tape 22 and the magnetic head 32 at a constant speed.

In a step 106, it is determined whether or not a time $T_{12}$ after the read/write process is completed reaches the value of the supply timing $T_{11}$ set in the step 104. The determining process in the step 106 is repeated until $T_{12} >= T_{11} = T_{10} + f(R_1)$ is satisfied. As a result, when it is determined that $T_{12} >= T_{11}$ is satisfied, a process in step 108 is processed next.

In a step 108, in order to decelerate the running speed of the magnetic tape 22, a process to reduce the motor current for the feed reel motor 70 and the take-up reel motor 72 is started.

In a step 110, it is determined whether or not a time $T_{21}$ after the process in step 108 is executed reaches the value of a predetermined time $T_{20}$. The predetermined time $T_{20}$ is the time to continue to decelerate the running speed of magnetic tape 22 and is determined as a constant time value beforehand. The determining process in the step 110 is repeated until $T_{21} >= T_{20}$ is satisfied. As a result, when it is determined that $T_{21} >= T_{20}$ is satisfied, a process in step 112 is processed next.

In a step 112, in order to stop the running of the magnetic tape 22, a process to stop each of the motors 70 and 72 is executed.

In a step 114, in order to turn over the magnetic tape 22, a process to supply motor current appropriate to each of the motors 70 and 72 is executed so that the motors 70 and 72 are reversed. When the process in the step 114 is executed, the running of the magnetic tape 22 is accelerated in a backward direction.

In a step 116, it is determined whether or not a time $T_{31}$ after the step 114 is executed reaches the value of a predetermined time $T_{30}$. The predetermined time $T_{30}$ is a time to continue to accelerate the speed of the magnetic tape 22 in the backward direction and is determined as a constant time value beforehand. The process in the step 110 is repeated until it is determined that $T_{31} >= T_{30}$ is satisfied. As a result, when it is determined that $T_{31} >= T_{30}$ is satisfied, a step 118 is processed next.

In the step 118, in 2order to maintain the constant speed of the magnetic tape 22, a process to maintain the motor current at a constant current level is executed.

In the step 120, a process to convert data $D_2$ to a random value $X_2$ is executed. The random $X_2$ is obtained from the predetermined random table.

In a step 122, a remainder $R_2$ is obtained from data $D_2$ divided by 5. Subsequently, a supply timing $T_{41}$ of the stop instruction signal to the feed reel motor 70 and the take-up reel motor 72 is set to be a value resulted from adding a time $f(R_2)$, which is proportional to the remainder $R_2$, to a reference time $T_{40}$. The reference time $T_{40}$ is the minimum time until the decelerating process of the magnetic tape 22 is started after the constant running process of the magnetic tape 22 in the backward direction is started.

In a step 124, it is determined whether or not a time $T_{42}$ after the constant running process for the magnetic tape 22 in the reverse direction is started is equal to or greater than the supply timing determined in step 122. The process in the step 124 is repeated until it is determined that $T_{42}>=T_{41}$ is satisfied. As a result, when it is determined that $T_{42}>=T_{41}$ is satisfied, a process in step 126 is processed next.

In the step 126, in order to decelerate the running speed of the magnetic tape 22 in the reverse direction, a process to reduce the motor current for the feed reel motor 70 and the take-up reel motor 72 is started.

In a step 128, it is determined whether or not a time $T_{51}$ after the process in the step 126 is executed reaches the value of a predetermined time $T_{50}$. The predetermined time $T_{50}$ is the time to continue to decelerate the running speed of the magnetic tape 22 in the backward direction and is determined as a constant time value beforehand. The determining process in the step 128 is repeated until it is determined that $T_{51}>=T_{50}$ is satisfied. As a result, when it is determined that $T_{51}>=T_{50}$ is satisfied, a process in a step 130 is processed next.

In the step 130, in order to stop the running of the magnetic tape 22, a process to stop each of the motors 70 and 72 is executed. After the process in the step 130 is completed, this routine is terminated.

According to the above processes, after the read/write process is completed, when the running of the magnetic tape 22 is turned over, the running speed of the magnetic tape 22 may be decelerated based on the timing randomly selected from the five timing options. Also, when the running of the magnetic tape 22 stopped, the running speed of the magnetic tape 22 can be decelerated based on the timing randomly selected from the five timing options. That is, when the timing to decelerate the running speed of the magnetic tape 22 is changed the turnover position or the stop position is displaced by a difference proportional to the timing varied along the running direction. According to the first embodiment, it can be avoided to frequently turn over or stop the magnetic tape 22 at a specific position. Therefore, it is possible to prevent severe abrasion at a specific position on the magnetic tape 22 and prevent dust from adhering on specific areas of the surface of the magnetic tape 22.

In the first embodiment, as mentioned above, each timing option for the turnover instruction signal or the stop instruction signal to the feed reel motor 70 and the take-up reel motor 72 is determined based on a time difference that is required to pass over at least a length of one contact area 39 between the magnetic tape 22 and magnetic head 32 at constant speed. Thus, the timing for turning over or stopping the magnetic tape 22, which is determined by the time difference according to the first embodiment, can prevent the contact area of the magnetic tape 22 contacting with the magnetic head 32 from being the same area. Therefore, according to the magnetic tape apparatus 20, after the read/write process is completed, it is possible to prevent severe abrasion at a specific position on the magnetic tape 22 and prevent dust from adhering on specific areas of the surface of the magnetic tape 22. Thus, advantageously, it is possible to improve the reliability of the read/write process to/from the magnetic tape 22.

In addition, in the first embodiment, the supply timing for the turnover instruction signal or the stop instruction signal to each of motors 70 and 72 is set based on a value randomly obtained each time the read/write process is completed. Since the position on the magnetic tape 22 where the read/write process is completed is detected, it is not required to count the executions of the read/write process at the position. The method according to the first embodiment of the present invention can be simplified more than a method in which the supply timing is determined based on the execution number of the read/write process at each position.

Figure 5:
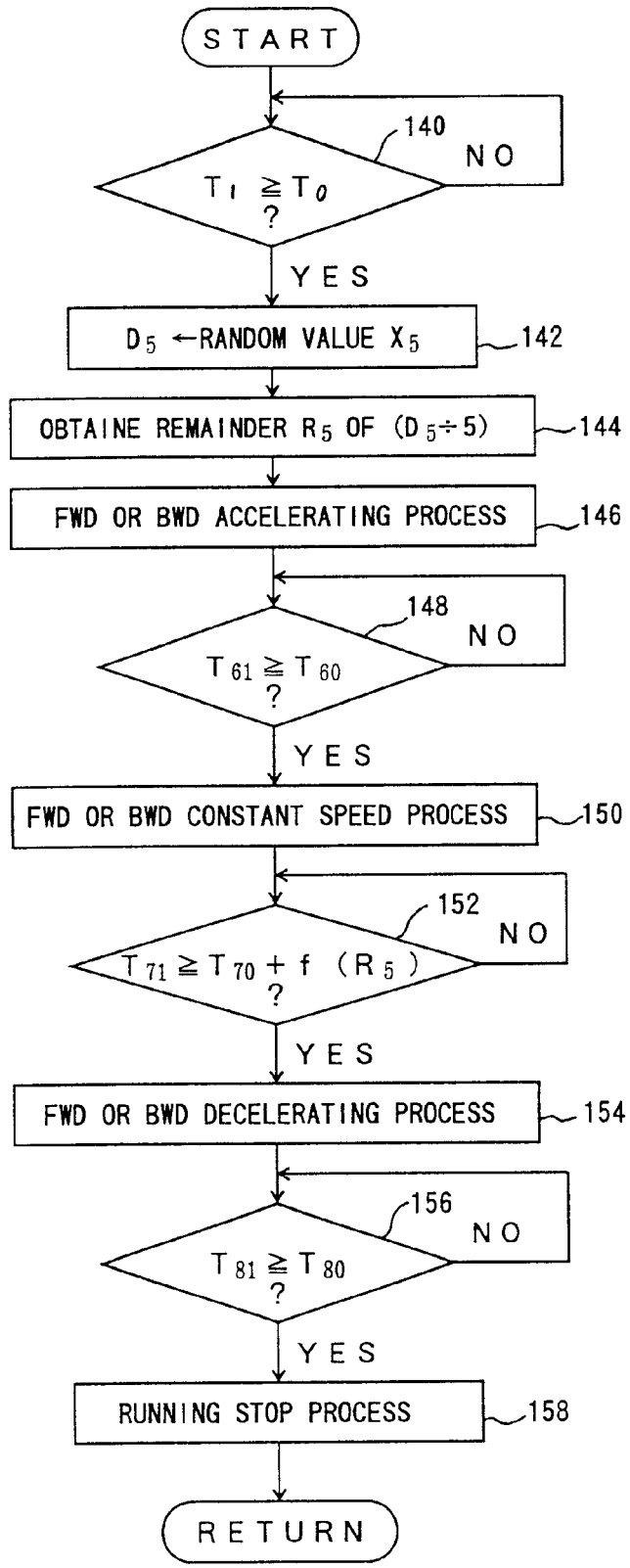
FIG. 5 is a flow chart for explaining another control routine executed by the processor part when the patrol reposition is carried out, according to the first embodiment of the present invention.

The method for achieving the above function will now be described in detail. FIG. 5 is a flow chart for explaining another control routine executed by the processor 40 when the patrol reposition is carried out, according to the first embodiment of the present invention. The control routine shown in FIG. 5 is executed again each time the control routine is completed. When the routine shown in FIG. 5 is executed, the process in a step 140 is processed.

In the step 140, it is determined whether or not a time interval $T_1$ in which the magnetic tape 22 is stopped at the same position reaches to a predetermined time value $T_0$. The predetermined time value $T_0$ is a time interval after the magnetic tape 22 is stopped and before the patrol reposition is carried out. The predetermined term $T_0$ is determined as a constant time interval beforehand. The process in the step 140 is repeated until it is determined that $T_1>=T_0$ is satisfied. As a result, when it is determined that $T_1>=T_0$ is satisfied, the process in a step 142 is executed next.

In the step 142, data $D_5$ is converted to a random value $X_5$ obtained from a predetermined random table.

In a step 144, a remainder $R_5$ is obtained from data $D_5$ divided by 5.

In the step 146, a stop state of the magnetic tape 22 is released and a process to supply the motor current to the feed reel motor 70 and the take-up reel motor 72 is started. That is, the magnetic tape 22 is operated to move the stop position to another position that has a constant remote distance from the stop position before the patrol reposition is carried out. In this case, the move distance for the patrol reposition is set as a distance such that a surface area of the magnetic tape 22 facing the magnetic head 32 in the stop status is passed over tape cleaners 34 and 36 shown in FIG. 2. When the process in the step 146 is executed, the running of the magnetic tape 22 is accelerated.

In a step 148, it is determined whether or not a time $T_{61}$ after the process in step 146 is executed reaches the value of a predetermined time $T_{60}$. The predetermined time $T_{60}$ is a time to continue accelerating the magnetic tape 22 and is determined as a constant value beforehand. The process in the step 148 is repeated until it is determined that $T_{61}>=T_{60}$ is satisfied. As a result, then it is determined that $T_{61}>=T_{60}$ is satisfied, the process in a step 150 is processed next.

In the step 150, in order to maintain constant speed of the magnetic tape 22, a process to maintain the motor current supplying each of motors 70 and 72 at a constant current level is started.

In a step 152, it is determined whether or not a time $T_{71}$ after the process to maintain the motor current constant is started reaches a value resulting from adding a time $f(R_5)$ which is proportional to the remainder $R_5$, to a reference time $T_{70}$. The reference time $T_{70}$ is a minimum time after the process to maintain the motor current is started and before a decelerating process for the magnetic tape 22 is started. Also, the reference time $T_{70}$ is determined based on the move distance of the magnetic tape 22 by the patrol reposition. The process in the step 152 is repeated until it is determined that $T_{71} >= T_{70}+f(R_5)$ is satisfied. As a result, when it is determined that $T_{71} >= T_{70}+f(R_5)$ is satisfied, the process in a step 154 is processed next.

In the step 154, in order to decelerate the running speed of the magnetic tape 22, a process to reduce a motor current for the feed reel motor 70 and the take-up reel motor 72 is started.

In a step 156, it is determined whether a time $T_{81}$ after the process in the step 154 is executed reaches a predetermined time $T_{80}$. The predetermined time $T_{80}$ is the time to continue to decelerate the running speed of magnetic tape 22 and is determined as a constant time value beforehand. The determining process in the step 154 is repeated until $T_{81} >= T_{80}$ is satisfied. As a result, when it is determined that $T_{81} >= T_{80}$ is satisfied, a step 158 is processed next.

In the step 158, in order to stop the running of the magnetic tape 22, a process to stop each of the motors 70 and 72 is executed. When the process in the step 158 is completed, this routine is terminated.

According to the above processes, the magnetic tape 22 is decelerated based on the timing randomly determined while the stop position is changed to another position by patrol reposition in order to avoid the state in which the magnetic tape 22 is stopped at the same position for a long time interval. According to the first embodiment, similarly to the case in which the read/write process to the magnetic tape 22 is completed, when the patrol reposition is carried out, it can be avoided to frequently turn over or stop the magnetic tape 22 at a specific position. Therefore, it is possible to prevent the magnetic tape 22 from being severely abraded at the specific position and to prevent dust from adhering on specific areas of the surface of the magnetic tape 22.

As mentioned above, in the first embodiment, the move distance for the patrol reposition is set as a distance such that a surface area of the magnetic tape 22 facing the magnetic head 32 in the stop status passes over tape cleaners 34 and 36 shown in FIG. 2. Therefore, in the magnetic tape apparatus 20 according to the first embodiment, it is possible to certainly remove dustadhered on the surface of the magnetic tape 22 during the running stop status before the patrol reposition when the patrol reposition is carried out.

In the first embodiment, the turnover position and the stop position on the magnetic tape 22 are displaced by varying the supply timing of the turnover instruction signal or the stop instruction signal to the feed reel motor 70 and the take-up reel motor 72 after the read/write process is completed. Further, the turnover position and the stop position on the magnetic tape 22 may be displaced by varying rotation speed of each of motors 70 and 72.

Also, in the first embodiment, the time interval in which the magnetic tape is operated at constant speed is varied. But, the method for varying the supply timing for signals to each of motors 70 and 72 is not limited to this. It is noted that the supply timing may be changed by varying the duration for decelerating the magnetic tape 22 after the read/write process is completed.

Moreover, in the first embodiment, the turnover position and the stop position on the magnetic tape 22 is displaced after the read/write process is completed. But the present invention is not limited to this method. Another method, in which the turnover position and the stop position on the magnetic tape 22 are displaced after the EOT is detected, may be applied.

Also, in the first embodiment, the supply timing of the turnover instruction signal or the stop instruction signal to the motors 70 and 72 are varied. But, the stop position can be displaced by changing the supply timing only for the turnover instruction signal while the distance between the turnover position and the stop position on the magnetic tape 22 is maintained.

Furthermore, in the first embodiment, the supply timing for the turnover instruction signal or the stop instruction signal to the motors 70 and 72 is randomly varied. But, the present invention is not limited to this method. The supply timing may be increased or decreased in sequence.

A second embodiment according to the present invention will now be described with reference to FIGS. 6, 7 and 8. A magnetic tape apparatus 80 according to the second embodiment can be realized by the processor 40 in FIG. 2 executing a routine shown in FIG. 8 when the magnetic head 32 is cleaned. The magnetic tape apparatus 80 in the second embodiment includes the same configuration as the magnetic tape apparatus 20 shown in FIG. 2.

Figure 6:
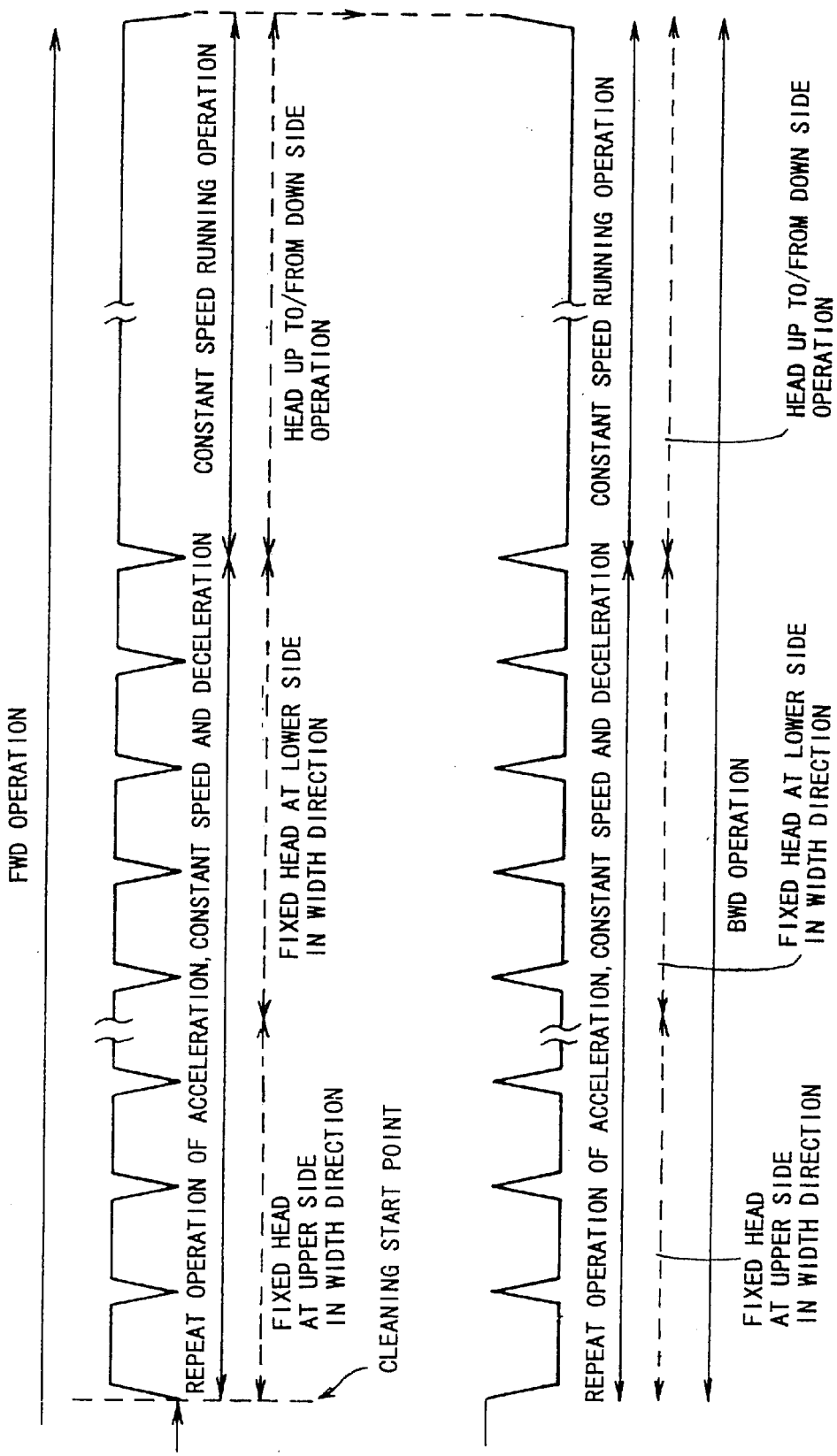
FIG. 6 is a schematic diagram showing a running control of the magnetic tape apparatus to clean the magnetic head in a magnetic tape apparatus from the related art.

FIG. 6 is a schematic diagram showing a running control of the magnetic tape 22 to clean the magnetic head 32 in a magnetic tape apparatus of the related art. In the magnetic tape apparatus of the related art, when a tape cassette accommodating a cleaning tape is loaded, the magnetic head 32 starts being cleaned from the beginning of the tape as shown in FIG. 6.

In details in the cleaning process, after the cassette is loaded, (1) in a state in which the magnetic head 32 is moved to and positioned at the up side of the width of the cleaning tape, the cleaning tape is cycled a predetermined number of times by accelerating, maintaining a constant speed and decelerating in a forward direction, (2) in a state in which the magnetic head 32 is moved to and positioned at the down side of the width of the cleaning tape, the cleaning tape is cycled a predetermined number of times, in the same manner as (1) above, by accelerating, maintaining the constant speed and decelerating in a forward direction, (3) in a state in which the cleaning tape is running at the constant speed, the magnetic head 32 is moved periodically up and down a predetermined number of times in the width direction, (4) the running of the cleaning tape is turned over and the above (1) through (3) processes are executed again in a backward direction.

In the above (1) and (2) in the cleaning process, tension is applied to the cleaning tape and then the entire surface of the magnetic head 32 is cleaned by acceleration and deceleration of the cleaning tape in the forward and backward directions. Also, in the above (3) in the cleaning process, the surface of the magnetic head 32 is cleaned in the width direction by the tension of the cleaning tape and the magnetic head 32 being accelerated or decelerated. Thus, according to the cleaning process, the surface of the magnetic head 32 is cleaned.

The cleaning tape has a tape length of about two times longer than that required for one cleaning process. However, the beginning of the cleaning tape is always used for the cleaning process of the magnetic head. Disadvantageously, the cleaning tape is not effectively used in the conventional construction and the cleaning effect of the cleaning tape is quickly degraded. Thus, it is effective to properly change the cleaning section of the cleaning tape in the cleaning process. Consequently, in the second embodiment, the cleaning section of the cleaning tape is properly changed each time the cleaning process is executed.

Figure 7:
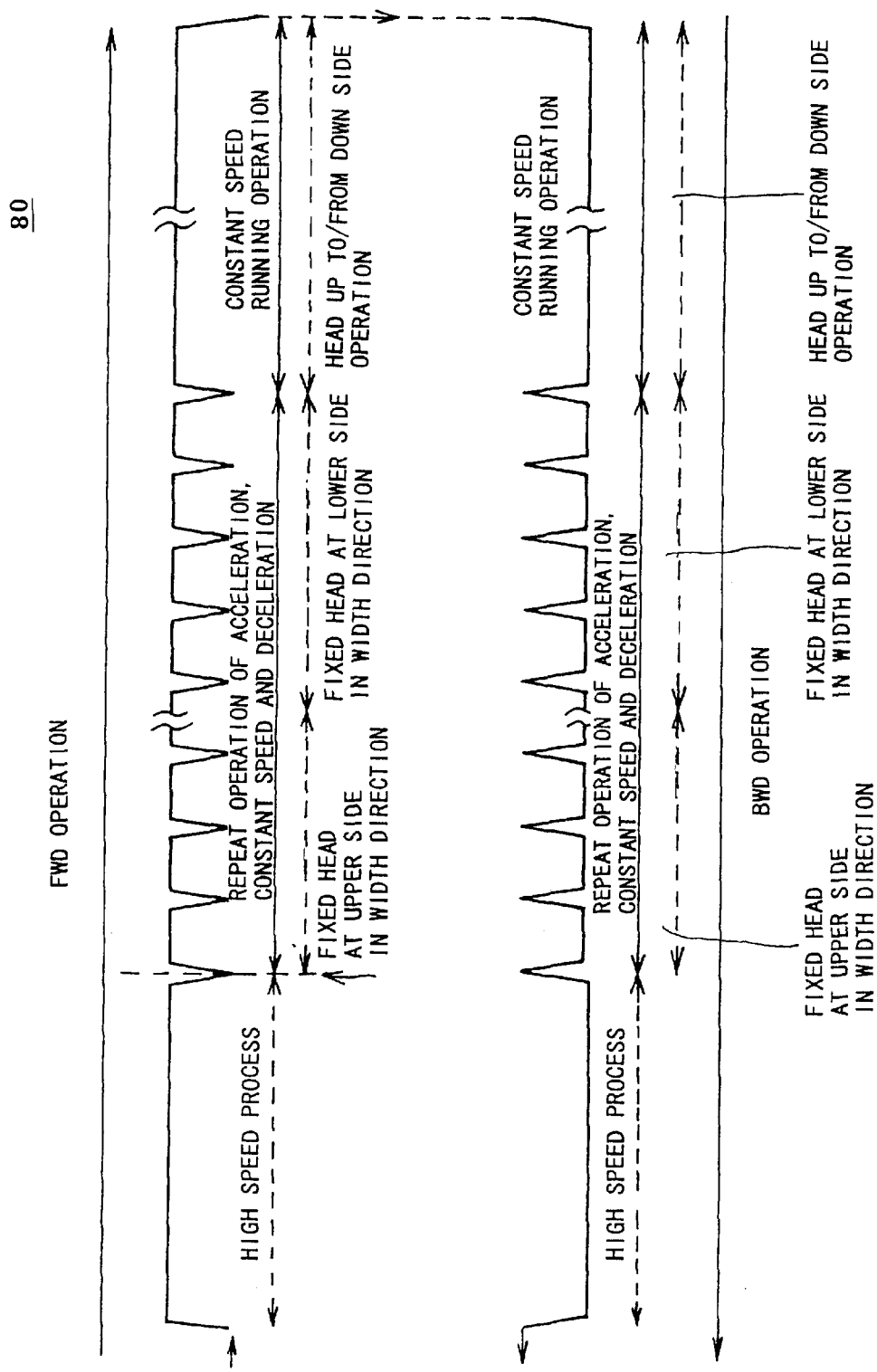
FIG. 7 is a schematic diagram showing a running control of the magnetic tape apparatus to clean the magnetic head according to the second embodiment of the present invention.

FIG. 7 is a schematic diagram showing a running control for the magnetic tape 22 to clean the magnetic head 32 according to the second embodiment of the present invention. A cassette tape, which is to be loaded into the magnetic tape apparatus 80 according to the second embodiment, accommodates a cleaning tape about five times longer than that required for one cleaning process for the magnetic head 32. In this embodiment, the cleaning section of the cleaning tape, which is used for the cleaning process of the magnetic head 32, is determined. As shown in FIG. 7, the cleaning tape is run until the selected cleaning start point of the cleaning section is properly positioned and then the above (1) through (4) in the cleaning process are executed from the cleaning start point. According to the cleaning process, using the same specific section every time the cleaning process is executed can be avoided. Therefore, it is possible to effectively use the cleaning tape.

Figure 8:
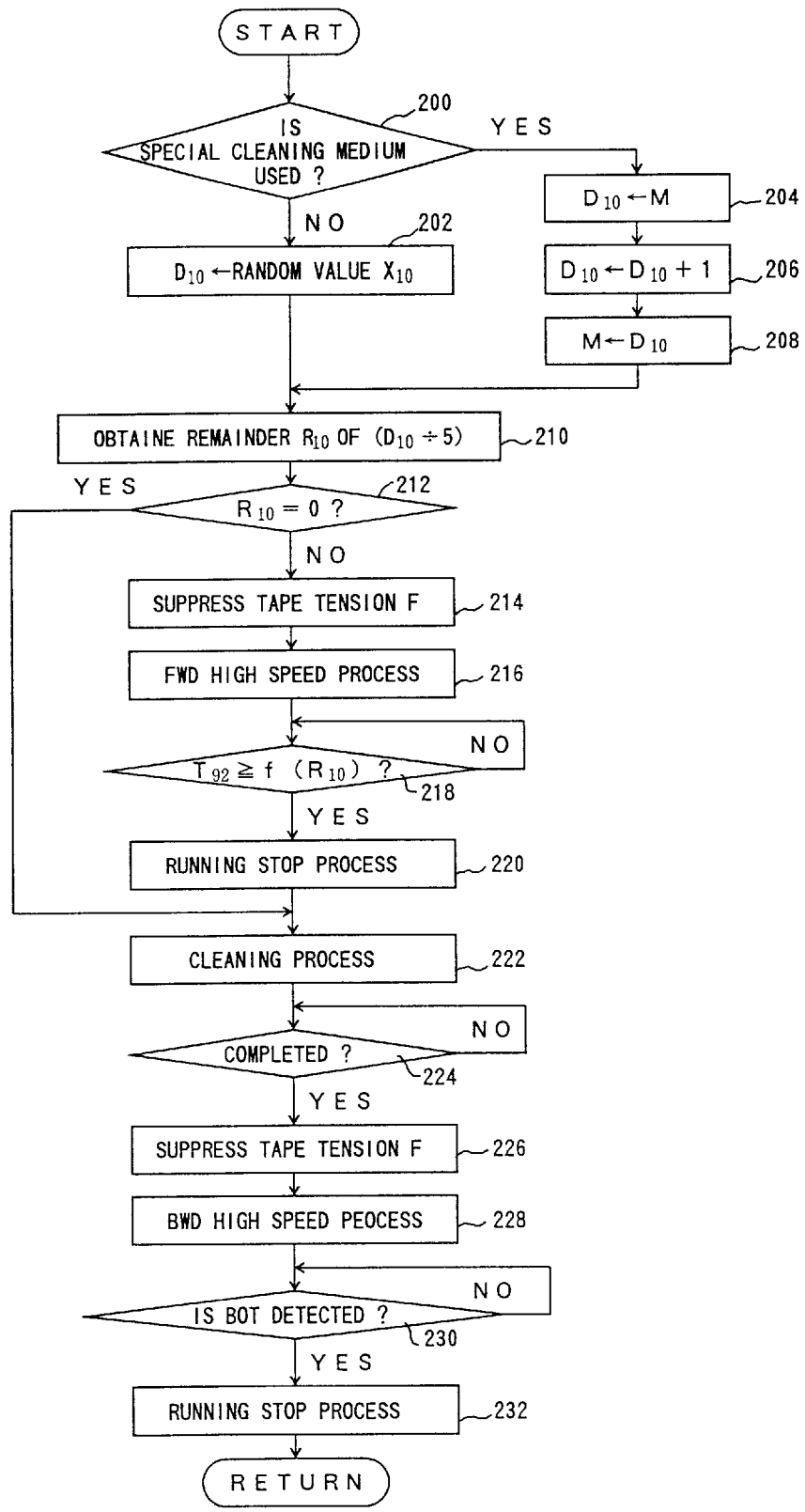
FIG. 8 is a flow chart for explaining a control routine executed by the processor part when the magnetic head is cleaned, according to the second embodiment of the present invention.

FIG. 8 is a flow chart for realizing the above function. More specifically, FIG. 8 is a flow chart for explaining a control routine executed by the processor 40 when the magnetic head 22 is cleaned, according to the second embodiment of the present invention. The control routine shown in FIG. 8 is executed again each time the control routine itself is completed. When the control routine shown in FIG. 8 is started, the process in a step 200 is executed.

In the step 200, it is determined whether or not a special cleaning tape is used in the magnetic tape apparatus 80 according to the second embodiment. When it is determined that the special cleaning tape is not used, that is, a cleaning tape used for other magnetic tape apparatuses is used or many cleaning tapes are used for the magnetic tape apparatus 80, a use frequency of the cleaning tape is not counted. Thus, in this embodiment, when the special cleaning tape is not used, the process in a step 202 is executed next.

In the step 202, data $D_{10}$ is converted to a random value $X_{10}$ obtained from a predetermined random table. After step 202 is completed, a process in step 210 is executed.

When it is indicated in the step 200 that the special cleaning tape is used, the use frequency of the cleaning tape can be properly counted. That is, it is possible to use the cleaning tape from the beginning consecutively. Accordingly, when the special cleaning tape is used in the second embodiment, the process in a step 204 is executed next.

In the step 204, the cleaning frequency of the cleaning tape stored in the nonvolatile memory 56 in FIG. 2 is set to data $D_{10}$.

In a step 206, data $D_{10}$ set in the step 204 is incremented by 1.

In a step 208, data $D_{10}$ incremented in the step 206 is stored in the nonvolatile memory 56 in FIG. 2.

In a step 210, a remainder $R_{10}$ is obtained by dividing data $D_{10}$, which is processed in the step 202 or the step 208, by 5. In this embodiment, since the cleaning tape has a tape length enough to execute the cleaning process for the magnetic head 32 five times, data $D_{10}$ is divided by 5.

In the step 212, it is determined whether or not the remainder $R_{10}$ is 0 (zero). When $R_{10}=0$ is not satisfied, the cleaning process of the magnetic head 32 starts from the middle of the cleaning tape because it is determined that the current cleaning section is not the beginning. In this case, it is needed to reel the cleaning tape at high speed until reaching the start point of another cleaning section. Then, when it is determined that the remainder $R_{10}$ is not 0 (zero), the process in a step 214 is executed next.

In the step 214, a ratio of rotation of the feed reel shaft 24 to that of the take-up reel shaft 26 is set such that the tension F applied to the cleaning tape in the running state is suppressed more than that in the normal state.

In a step 216, while the rotation ratio set in the step 214 is maintained, a process to supply a motor current to the feed reel motor 70 and the take-up reel motor 72 is executed so that the cleaning tape runs from the beginning of the cleaning tape to the cleaning start point in the forward direction at high speed.

In a step 218, it is determined whether a time $T_{92}$ after the cleaning tape runs at the high speed reaches the value of a time $f(R_{10})$ corresponding to the remainder $R_{10}$ obtained in the step 210. The determining process in the step 218 is repeated until it is determined that $T_{92}>=f(R_{10})$ is satisfied. As a result, when it is determined that $T_{92}>=f(R_{10})$ is satisfied, the process in a step 220 is executed next.

In this embodiment, the time $f(R_{10})$ is increased by time required for the cleaning tape to run a distance needed for a single cleaning step for the magnetic head 32, each time the remainder $R_{10}$ is incremented by 1 while the cleaning tape runs at high speed. That is, the cleaning start point on the cleaning tape becomes farther from the beginning of the cleaning tape and nearer to the end of the cleaning tape each time the remainder $R_{10}$ is incremented.

In the step 220, in order to stop the cleaning tape after the high speed running, a process to stop the rotation of the feed reel motor 70 and the take-up reel motor 72 is executed. When the process in the step 220 is completed, the process in a step 222 is executed.

On the other hand, when $R_{10}=0$ is satisfied in the step 212, it is determined that the cleaning process of the magnetic tape 32 will start from the beginning of the cleaning tape. In this case, it is not required to run the cleaning tape at high speed. Thus, when it is determined that $R_{10}=0$ is satisfied, the processes in step 214 through 220 are not executed but the control routine jumps to a step 222 and then the process in the step 222 is executed.

In the step 222, a process to supply an appropriate motor current to the feed reel motor 70, the take-up motor 72 and motor 76 to clean the magnetic head 32 is executed.

In detail, in a state in which the magnetic head 32 is moved to and positioned at the up side of the width of the cleaning tape in a running process in the forward direction, the motor current is supplied to the motors 70, 72 and 76 such that the running of the cleaning tape is cycled to accelerate, maintain the constant speed and decelerate a predetermined number of times. Subsequently, in a state in which the magnetic head 32 is moved to and positioned at the down side of the width of the cleaning tape, the motor current is supplied to the motors 70, 72 and 76 such that the running of the cleaning tape is cycled to accelerate, maintain the constant speed, and decelerate a predetermined number of times. Also, in the running process of the cleaning tape in the backward direction, the motor current is supplied to the motors 70, 72 and 76 in the same manner as in the forward direction.

In a step 224, it is determined whether the cleaning process to the magnetic head 32 is completed. The process in the step 224 is repeated until it is determined that the cleaning process to the magnetic head 32 is completed. As a result, when it is determined that the cleaning process is completed, the process in a step 226 is executed.

In the step 226, in the same manner as in the step 214, the ratio of rotation of the feed reel shaft 24 to that of the take-up reel shaft 26 is set such that the tension F applied to the cleaning tape in the running state is suppressed more than that in the normal state.

In a step 228, while the rotation ratio set in the step 226 is maintained, a process to supply a motor current to the feed reel motor 70 and the take-up reel motor 72 is executed so that the cleaning tape runs from the beginning of the cleaning tape to the cleaning start point in the forward direction at high speed.

In a step 230, it is determined whether or not the BOT (Begin Of Tape) written at the beginning of the cleaning tape is detected. As a result, when the BOT is not detected, the high speed running of the cleaning tape is continued. On the other hand, when the BOT is detected, a process in step 232 is executed next.

In a step 232, in order to stop the high speed running of the cleaning tape, the process to stop the rotation of the feed reel motor 70 and the take-up reel motor 72 is executed. When the process in step 232 is completed, this control routine is terminated.

In the second embodiment, two DACs in the DAC unit 48 and two AMPs in the AMP unit 74 in the configuration in FIG. 2 may be provided for the feed reel motor 70 and the take-up motor 72, respectively. Therefore, it can be realized that the feed reel motor 70 and the take-up reel motor 72 are independently rotated based on the rotation ratio set in step 214 or step 226 by the processor 40.

According to the routine mentioned above, the cleaning start point on the cleaning tape is changed each time the magnetic head 32 is cleaned. Thus, in this embodiment, since using only the beginning of the cleaning tape can be avoided, the entire cleaning tape can be evenly utilized. Consequently, according to the magnetic tape apparatus 80, the endurance of the cleaning tape can be improved.

Moreover, according to the control routine in the second embodiment, when the cleaning tape runs from the beginning to the cleaning start point at high speed or from the ending point to the beginning of the cleaning tape, the tension applied to the cleaning tape can be suppressed. Since the tension applied to the cleaning tape is suppressed in this approach, even when the cleaning tape runs at high speed, it is possible to prevent the cleaning tape from being deteriorated by an increased abrasion between the magnetic head 32 and the cleaning tape and also it is possible to prevent from impairing the surface of the cleaning tape. Therefore, according to the second embodiment, it is possible to prevent from degrading the endurance of the cleaning tape caused by high speed running.

In FIG. 8 in the second embodiment, the cleaning section is selected in an orderly manner when the special cleaning tape is used. But alternatively, the steps 200, 204, 206 and 208 in FIG. 8 may be omitted so as to always randomly set the cleaning section, instead of being concerned with only the special cleaning tape.

In the present invention, when the magnetic tape is operated, the stop position is displaced each time the magnetic tape is stopped. Therefore, it is possible to prevent the magnetic tape from being severely abraded at the specific position and to prevent dust from adhering on specific areas of the surface of the magnetic tape.

In addition, in the present invention, when the cleaning medium is operated, the cleaning section on the cleaning medium is determined each time the magnetic head is cleaned. Thus, since it using only the beginning of the cleaning medium can be avoided, the entire cleaning medium can be evenly utilized. Consequently, the endurance of the cleaning medium can be improved.

The present invention is not limited to the specifically disclosed embodiments, variations and modifications, and other variations and modifications may be made without departing from the scope of the present invention.

The present application is based on Japanese Priority Application No. 11-230585 filed on Aug. 17, 1999, the entire contents of which are hereby incorporated by reference.

What is claimed is:

1. A magnetic tape apparatus for controlling a running of a magnetic tape to stop at a reference stop position, comprising:

a feed reel shaft and a take-up reel shaft respectively adapted to hold a feed reel and a take-up reel of the magnetic tape;

a magnetic head;

a control part controlling the feed reel shaft and the take-up reel shaft so as to reel the magnetic tape; and a stop position control part varying a displacement of a stop position of the magnetic tape from the reference position by changing a supply timing for each stoppage of the magnetic tape at the same reference stop position, wherein said control part activates the stop position control part so as to displace the stop position when said control part stops the running of the magnetic tape.

2. The magnetic tape apparatus as claimed in claim 1, wherein said control part activates the stop position control part so as to displace the stop position when said control part stops running the magnetic tape.

3. The magnetic tape apparatus as claimed in claim 1, wherein said stop position control part displaces the stop position of the magnetic tape with a distance longer than a length of a contact area of the magnetic tape contacting with the magnetic head from said stop position as a reference position.

4. The magnetic tape apparatus as claimed in claim 1, wherein said stop position control part randomly selects one stop position from a plurality of predetermined supply timings so that the one stop position is displaced from the reference position.

5. The magnetic tape apparatus claimed in claim 1, wherein said stop position control part selects one stop position from a plurality of predetermined supply timings consecutively so that the selected stop position is displaced from the reference position consecutively.

6. The magnetic tape apparatus as claimed in claim 1, wherein said stop position control part changes a supply time interval for supplying power to the feed reel shaft and the take-up reel shaft so that the stop position is displaced from the reference position.

7. The magnetic tape apparatus as claimed in claim 1, wherein said stop position control part changes a rotational speed of the feed reel shaft and the take-up reel shaft so that the stop position is displaced from the reference position.

8. A method for controlling a running of a magnetic tape to stop at a reference stop position, comprising the steps of:

(a) controlling a feed reel shaft and a take-up reel shaft so as to reel the magnetic tape; and (b) varying a displacement of a stop position of the magnetic tape from the reference position by changing a supply timing for each stoppage of the magnetic tape at the same reference stop position, wherein the step (a) activates the step (b) so as to vary a displacement of the stop position when said control part stops the running of the magnetic tape.

9. The method as claimed in claim 8, wherein said step (a) activates the step (b) so as to displace the stop position when said step (a) stops running the magnetic tape.

10. The method as claimed in claim 8, wherein said step (b) displaces the stop position of the magnetic tape at a distance longer than a length of a contact area of the magnetic tape contacting with the magnetic head from the reference position.

11. The method as claimed in claim 8, wherein said step (b) randomly selects one stop position from a plurality of predetermined supply timings so that the one stop position is displaced from the reference position.

12. The method as claimed in claim 8, wherein said step (b) selects one stop position from a plurality of predetermined supply timings consecutively so that the selected stop position is displaced from the reference position consecutively.

13. The method as claimed in claim 8, wherein said step (b) changes a supply time interval for supplying power to the feed reel shaft and the take-up reel shaft so that the stop position is displaced from the reference position.

14. The method as claimed in claim 8, wherein said step (b) changes a rotational speed of the feed reel shaft and the take-up reel shaft so that the stop position is displaced from the reference position.

* * * * *